US006194873B1

(12) United States Patent
Matsushita

(10) Patent No.: US 6,194,873 B1
(45) Date of Patent: Feb. 27, 2001

(54) POWER SOURCE SUPPLYING CIRCUIT AND METHOD COMPRISING A CONSTANT-VOLTAGE CONTROL ARRANGEMENT

(75) Inventor: Akimasa Matsushita, Saitama (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/491,468

(22) Filed: Jan. 26, 2000

(30) Foreign Application Priority Data

Jan. 26, 1999 (JP) ............................................ 11-016583

(51) Int. Cl.[7] ......................... H01M 10/44; H01M 10/46

(52) U.S. Cl. ........................................................ 320/137

(58) Field of Search ................................... 320/123, 124, 320/125, 134, 136, 137, 162

(56) References Cited

U.S. PATENT DOCUMENTS 5,736,833 * 4/1998 Farris .
5,909,101 * 6/1999 Matsumoto et al. .

FOREIGN PATENT DOCUMENTS

0280514A1 8/1998 (EP) .
1092863 11/1967 (GB) .
1365755 9/1974 (GB) .
1444164 7/1976 (GB) .
2325313 11/1998 (GB) .
2334600 8/1999 (GB) .
64-30430 2/1989 (JP) .
8-317571 11/1996 (JP) .
9-130981 5/1997 (JP) .
9-919231 7/1997 (JP) .
2571356 2/1998 (JP) .
10-243553 9/1998 (JP) .

* cited by examiner

*Primary Examiner*—Edward H. Tso
(74) *Attorney, Agent, or Firm*—Scully, Scott, Murphy & Presser

(57) ABSTRACT

In a power source supplying circuit for supplying a load with an external power source voltage supplied from an external power source terminal thereof, a backflow check diode and a current limiting resistor are disposed in a side of the external power source terminal out of a charging control transistor. The power source supplying circuit further comprises a constant voltage control circuit for controlling the charging control transistor and a battery voltage monitoring feedback resistor connected to the load.

8 Claims, 4 Drawing Sheets

POWER SOURCE SUPPLYING CIRCUIT AND METHOD COMPRISING A CONSTANT-VOLTAGE CONTROL ARRANGEMENT

BACKGROUND OF THE INVENTION

This invention relates to a power source supplying circuit and a power source supplying method and, more particularly, to a power source supplying circuit and a power source supplying method which are capable of supplying a constant voltage to a load although variation of a load current is large.

As is well known in the art, power source supplying circuits of the type described are classified into two types, namely, first and second types in the manner which will presently be described. Specifically, the first type of the power source supplying circuits are a type where there is no charging circuit while the second type of the power source supplying circuits are a type comprising a charging control circuit. At first, the first type will be described. The second type will be later in the following.

In the manner which will later be described in conjunction with FIG. 1, a conventional power source supplying circuit of the first type has an external input/output connector power supply terminal, an external input/output connector ground terminal, a battery connection power source terminal, and a battery connection ground terminal. The battery connection power source terminal is connected to a portable radio apparatus serving as a load. A backflow check diode is disposed between the external input/output connector power source terminal and the battery connection power source terminal. Specifically, the backflow check diode has an anode electrode connected to the external input/output connector power source terminal and a cathode electrode connected to the battery connection power source terminal. As described above, the first type of the conventional power source supplying circuit does not carry out a power source control.

In the manner which will later be described in conjunction with FIG. 2, it is impossible for the conventional power source supplying circuit of the first type to supply the portable radio apparatus with a stable voltage. This is because a supply voltage drops by one corresponding to a voltage drop caused by a load current.

In the manner which will later be described in conjunction with FIG. 3, a conventional power source supplying circuit of the second type has not only the external input/output connector power supply terminal, the external input/output connector ground terminal, the battery connection power source terminal, and the battery connection ground terminal but also a battery connection battery presence or absence detection terminal. A charging control transistor is disposed between the external input/output connector power source terminal and the backflow check diode. A current limiting resistor is disposed between the backflow check diode and the battery connection power source terminal. Specifically, the charging control transistor consists of a P-channel metal oxide semiconductor field effect transistor (MOSFET). The P-channel MOSFET has a source electrode connected to the external input/output connector power source terminal and a drain electrode connected to the anode electrode of the backflow check diode. The cathode electrode of the backflow check diode is connected to an end of the current limiting resistor which has another end connected to the battery connection power source terminal.

The conventional power source supply circuit of the second type further comprises a current detection circuit for detecting a current flowing in the current limiting resistor and a charging control circuit. The charging control circuit is supplied with a current detected signal and a battery presence and absence detected signal from the current detection circuit and the battery connection batter presence and absence detection terminal, respectively. Responsive to the current detected signal and the battery presence and absence detected signal, the charging control circuit controls the charging control transistor. The charging control circuit supplies a control signal to a control terminal (gate electrode) of the charging control transistor.

In the manner which will later be described in conjunction with FIG. 4, inasmuch as the backflow check diode and the current limiting resistor serves as a voltage drop arrangement. As a result, it is difficult for the conventional power source supplying circuit of the second type to supply the portable radio apparatus (the load) with a stable voltage.

In addition, various prior arts related to this invention are already known. By way of example, Japanese Utility Model Registration No. 2,571,356 or JP-Y2571356 discloses an absolute displacement measurement equipment comprising a power source voltage control circuit. In the power source voltage control circuit described in JP-Y 2571356, a voltage supplied from a solar cell is supplied to an EEPROM acting as a load via a first backflow check diode and two paths. A first path supplies the load with the voltage through a small-capacity capacitor for stabilizing a power source voltage. A second path supplies the load with the voltage through a constant current circuit, a charging circuit, a large-capacity capacitor, and a second backflow check diode. In addition, the power source voltage control circuit is provided with a voltage detection circuit for detecting a voltage between both ends of the large-capacity capacitor to produce a voltage detected signal which is supplied to the load and the charging circuit.

However, in the manner as the conventional power source supplying circuit of the first type, it is impossible for JP-Y2571356 to supply the load with a stable voltage caused by a voltage drop in the backflow check diode.

In addition, Japanese Unexamined Patent Publication of Tokkai No. Show 64-30, 430 or JP-A 1-030430 discloses a power source circuit which is capable of preventing overcurrent even when a capacitor with large capacitance is employed, by providing a resistor for limiting charging current of capacitor, a bypass diode and a diode for preventing reverse charging of capacitor. The power source circuit disclosed in JP-A 1-030430 comprises a series circuit, a capacitor, and a bypass diode. The series circuit is connected between a DC power source and a load. The series circuit consists of a backflow check diode, a current limiting resistor, and a back-charging check diode. The capacitor is connected between a ground and a connection point of the current limiting resistor and the back-charging check diode. The capacitor supplies the load with an electric power on instantaneously breaking of the DC power source and on decreasing of a voltage. The bypass diode is in parallel connected to the series circuit. The bypass diode supplies the load with the electric power when the DC power source is normal or when the capacitor is initially charged.

With this structure, even when the capacity of the capacitor is increased, initial charging current of the capacitor is limited by the current limiting resistor. Consequently, overcurrent does not flow into the backflow check diode and voltage drop of the DC power source due to overload causes no bad influence onto the load. Inasmuch as the current limiting resistor is inserted, long time is required until charging voltage of the capacitor increases to a level for enabling operation of the load during initial charging stage. Consequently, the bypass diode is connected to supply power normally from the DC power source through the bypass diode to the load.

However, it is difficult for JP-A 1-030430 to supply the load with a stable voltage because of voltage drop in the backflow check diode, the current limiting resistor, the back-charging check diode.

Furthermore, Japanese Unexamined Patent Publication of Tokkai No. Hei 8-317,571 or JP-A 8-317571 discloses a charge circuit for a secondary battery, which prevents the reverse flow of a current from a battery to the side of a charge circuit, and also shortens the charge time by enabling the accurate measurement of battery voltage, and further does not deteriorate the battery due to overcharge. In the charge circuit for the secondary battery disclosed in JP-A 8-317571, a reverse flow preventive (backflow check) diode is inserted between a secondary battery and a charge current control circuit which controls the charge current to be supplied to the secondary battery, on the basis of the output of a voltage detecting circuit for detecting the terminal voltage of the secondary battery. An FET is inserted between the secondary battery and the voltage detection circuit. A switch control circuit performs the control to put the FET in current-conduction state when the power source for charge is turned on and to put it in no current-conduction state when the power source for charge is turned off.

The above-mentioned JP-A 8-317571 may disclose the invention related to the charge circuit for the secondary battery. If the battery regards as a load in JP-A8-317571, it is difficult to supply the load (the battery) with a stable voltage because of voltage drop in the reverse flow preventive (backflow check) diode.

In addition, Japanese Unexamined Patent Publication of Tokkai No. Hei 10-243,553 or JP-A 10-243553 discloses a battery-driven electronic equipment and a control method therefor, which are capable of miniaturizing an external power supply with a function of charging an internal battery maintained, by controlling a charging circuit according to the presence or absence of connection with the external power supply and the state of the operation of electronic equipment. In the battery-driven electronic equipment disclosed in JP-A 10-243553, a system-off signal generated by a power switch is supplied to a power supply control circuit. The power supply control circuit sends a control signal to a constant voltage control circuit. The constant voltage control circuit turns off a constant voltage circuit (charging circuit), and a system is thereby turned off. Thereafter, the power supply control circuit sends a control signal to a charge control circuit, and the charge control circuit turns off the charging circuit to charge a battery. Thereby, an external power supply of small capacity can be used with a charging function maintained, and thus the external power supply can be miniaturized in electronic equipment.

Inasmuch as a voltage is supplied to the system from the external power supply through the constant voltage circuit in JP-A 10-243553, a predetermined voltage may be supplied to the system. However, in a case where there is a voltage drop arrangement such as a backflow check diode, a current limiting resistor, or the like, JP-A 10-243553 never discloses a concrete embodiment regarding how to supply a constant voltage.

Japanese Unexamined Patent Publication of Tokkai No. Hei 9-130,981 or JP-A 9-130981 discloses a charge control device which is capable of always holding charged voltage of a battery at a charge stop voltage. In the charge control device disclosed in JP-A 9-130981, when voltage of a battery decreases to set a mobile terminal such as a portable telephone set, a portable radio terminal, or the like to a charger for charging, a microcomputer turns on first and second changeover switches and turns off a third changeover switch, so that a charge current is supplied to the battery and the mobile terminal, that is, a portable device control circuit through a protecting diode by an external control circuit. When completion of charging is detected by the microcomputer, it turns off the first and the second changeover switches also turns on the third changeover switch, the current by the external input voltage is supplied only to the mobile terminal, that is, the portable device control circuit, so as to suppress consumption of the battery.

In the above-mentioned JP-A 9-130981, the microcomputer merely carries out a constant voltage charging control operation to the battery by controlling turning on and off of the first through the third changeover switches. In other words, JP-A 9-130981 never describes regarding how to hold a voltage constant in a case where a load current of a load varies.

In addition, Japanese Unexamined Patent Publication of Tokkai No. Hei 9-190,231 or JP-A 9-190231 discloses a power source device which is capable of outputting highly precise voltage. According to JP-A 9-190-231, the power source device comprises a voltage control circuit of a shunt regulator system that is connected to a power supply circuit through a resistor. The voltage control circuit is connected in parallel with a load.

However, a load variation is not taken into account at all in the above-mentioned JP-A 9-190231 in the similar manner as JP-A9-130981. That is, JP-A 9-190231 never discloses nor teaches regarding how to hold a voltage constant in a case where a load current of the load varies.

SUMMARY OF THE INVENTION

It is therefore an object of this invention to provide a power source supplying circuit and a power source supplying method, which is capable of always supplying a load with a constant stable voltage although a load current drastically varies.

Other objects of this invention will become clear as the description proceeds.

According to a first aspect of this invention, a power source supplying circuit supplies a load with an external power source voltage supplied from an external power source terminal thereof. The power source supplying circuit comprises a backflow check diode, a current limiting resistor, and a charging control transistor. The backflow check diode and the current limiting resistor are disposed in a side of the external power source terminal out of the charging control transistor. The power source supplying circuit further comprises a current detection circuit connected between both ends of the current limiting resistor. The current detection circuit detects a current flowing the current limiting resistor on the basis of a potential difference between the both ends of the current limiting resistor to produce a current detected signal. Connected to the current detection circuit and supplied with a battery presence or absence detected signal, a charging control circuit controls the charging control transistor in response to the current detected signal and the battery presence and absence detected signal. A feedback resistor has an end connected to said load. Connected to another end of the feedback resistor, a constant-voltage control circuit controls the charging control transistor so as to make a voltage supplied to the load a constant voltage, thereby always supplying a constant stable voltage to the load although a load current of the load varies.

According to a second aspect of this invention, a power source supplying method supplies a load with an external power source voltage supplied from an external power source terminal. The power source supplying method comprises the steps of applying the external power source voltage through a backflow check diode and a current limiting resistor, of controlling, using constant-voltage control means, a dropped voltage to which the external power source voltage is dropped by the backflow check diode and the current limiting resistor so as to make the dropped voltage a constant voltage, and of supplying the constant voltage to the load, thereby always supplying the load with a constant stable voltage although a load current of the load varies.

According to a third aspect of this invention, a power source supplying circuit supplies a load through a backflow check diode with a voltage supplied from an external power source terminal. The power source supplying circuit comprises a constant-voltage control arrangement disposed between the backflow check diode and the load, thereby always supplying the load with a constant stable voltage although a load current of the load varies.

According to a fourth aspect of this invention, a power source supplying method supplies a load with an external power source voltage supplied from an external power source terminal. The power source supplying method comprises the steps of applying the external power source voltage through a backflow check diode, of controlling, using a constant-voltage control arrangement, a dropped voltage to which the external power source voltage is dropped by the backflow check diode so as to make the dropped voltage a constant voltage, and of supplying the constant voltage to the load, thereby always supplying the load with a constant stable voltage although a load current of the load varies.

DESCRIPTION OF THE PREFERRED EMBODIMENTS

Figure 1:
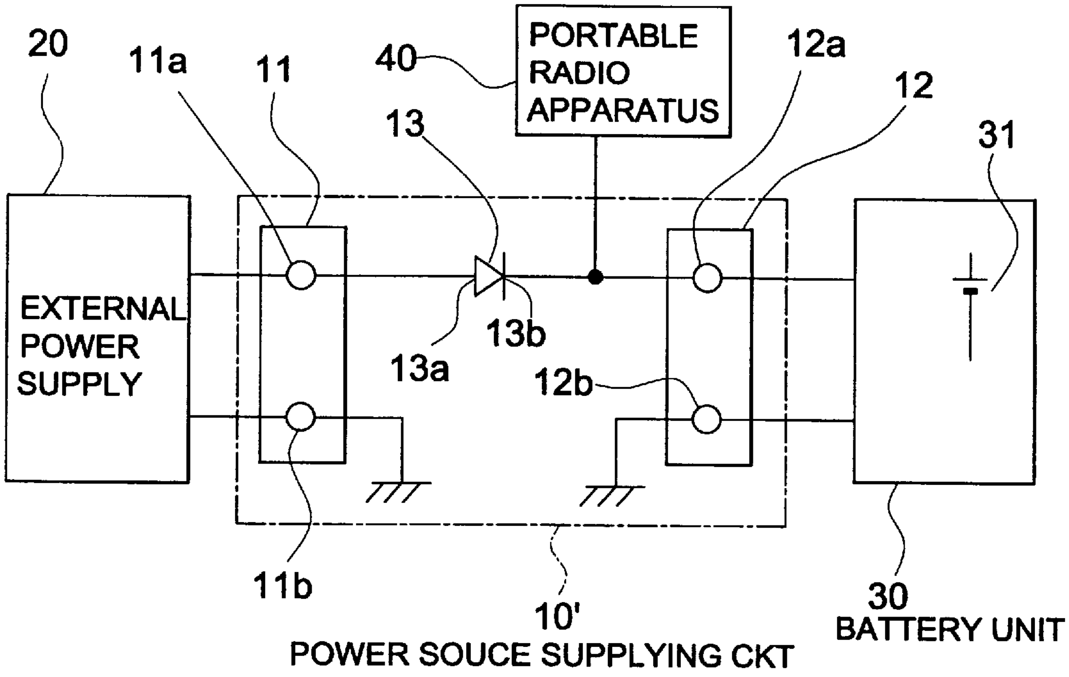
FIG.1 PRIOR ART
FIG. 1 is a block diagram of a conventional power source supplying circuit of a first type.

Referring to FIG. 1, a conventional power source supplying circuit 10' of a first type will be described at first in order to facilitate an understanding of the present invention. The illustrated power source supplying circuit 10' comprises an external input/output connector 11 and a battery connection terminal 12. The external input/output connector 11 is connected to an external power supply 20 while the battery connection terminal 12 is connected to a battery unit 30 including a battery 31.

The external input/output connector 11 has an external input/output connector power supply terminal 11*a* and an external input/output connector ground terminal 11*b* which is grounded. The battery connection terminal 12 has a battery connection power source terminal 12*a* and a battery connection ground terminal 12*b* which is grounded.

The power source supplying circuit 10' is connected to a portable radio apparatus 40 serving as a load. Specifically, the portable radio apparatus 40 is connected to the battery connection power source terminal 12*a*. The power source supplying circuit 10' comprises a backflow check diode 13 which is disposed between the external input/output connector power source terminal 11*a* and the battery connection power source terminal 12*a*. Specifically, the backflow check diode 13 has an anode electrode 13*a* connected to the external input/output connector power source terminal 11*a* and a cathode electrode 13*b* connected to the battery connection power source terminal 12*a*. As described above, the first type of the conventional power source supplying circuit 10' does not carry out a power source control.

Figure 2:
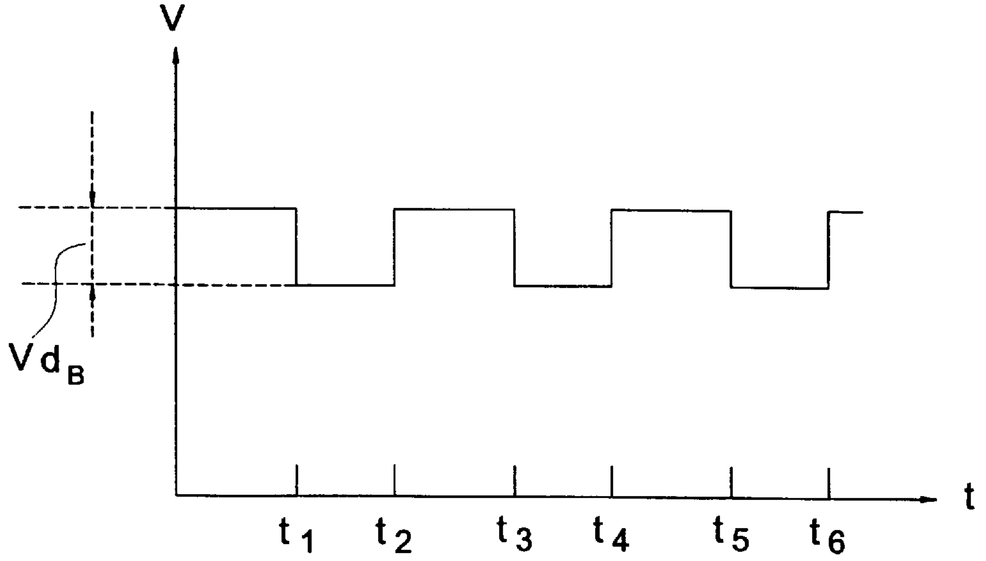
FIG.2 PRIOR ART
FIG. 2 shows a timing chart for use in describing operation of the power source supplying circuit illustrated in FIG. 1.

Referring now to FIG. 2 in addition to FIG. 1, the description will proceed to operation of the conventional power source supplying circuit 10'. FIG. 2 illustrates a waveform of a voltage supplied to the portable radio apparatus 40. In FIG. 2, the abscissa represents a time instant t and the ordinate represents the voltage V. FIG. 2 illustrates an example where a first load current occurs at a first time instant $t_1$, the first load current is released a second time instant $t_2$, a second load current occurs at a third time instant $t_3$, the second load current is released at a fourth time instant $t_4$, a third load current occurs at a fifth time instant $t_5$, and the third load current is released at a sixth time instant $t_6$. In the manner which is described above, the portable radio apparatus 40 repeats occurrence and release of the load current.

It will be assumed that an external power source voltage is applied to the external input/output connector power source terminal 11*a* and the portable radio apparatus 40 connected to the battery connection power source terminal 12*a* carries out transmission and reception to flow the load current of several hundreds of milliamperes. In this event, a voltage in the battery connection power source terminal 12*a* drops than the external power source voltage caused by a forward voltage $V_f$ of the backflow check diode 13. That is, the backflow check diode 13 serves as a voltage drop arrangement. Accordingly, as illustrated in FIG. 2, the load current flows during a time duration from the first time instant $t_1$ of occurrence of the first load current to the second time instant $t_2$ of release of the first load current, during a time duration from the third time instant $t_3$ of occurrence of the second load current to the fourth time instant $t_4$ of release of the second load current, and during a time duration from the fifth time instant $t_5$ of occurrence of the third load current to the sixth time $t_6$ of release of the third load current. As a result, it is impossible for the conventional power source supplying circuit 10' of the first type to supply the portable radio apparatus 40 with a stable voltage, as mentioned in the preamble of the instant specification. This is because a supply voltage drops by a part corresponding to a voltage drop $Vd_B$ caused by the load current.

Figure 3:
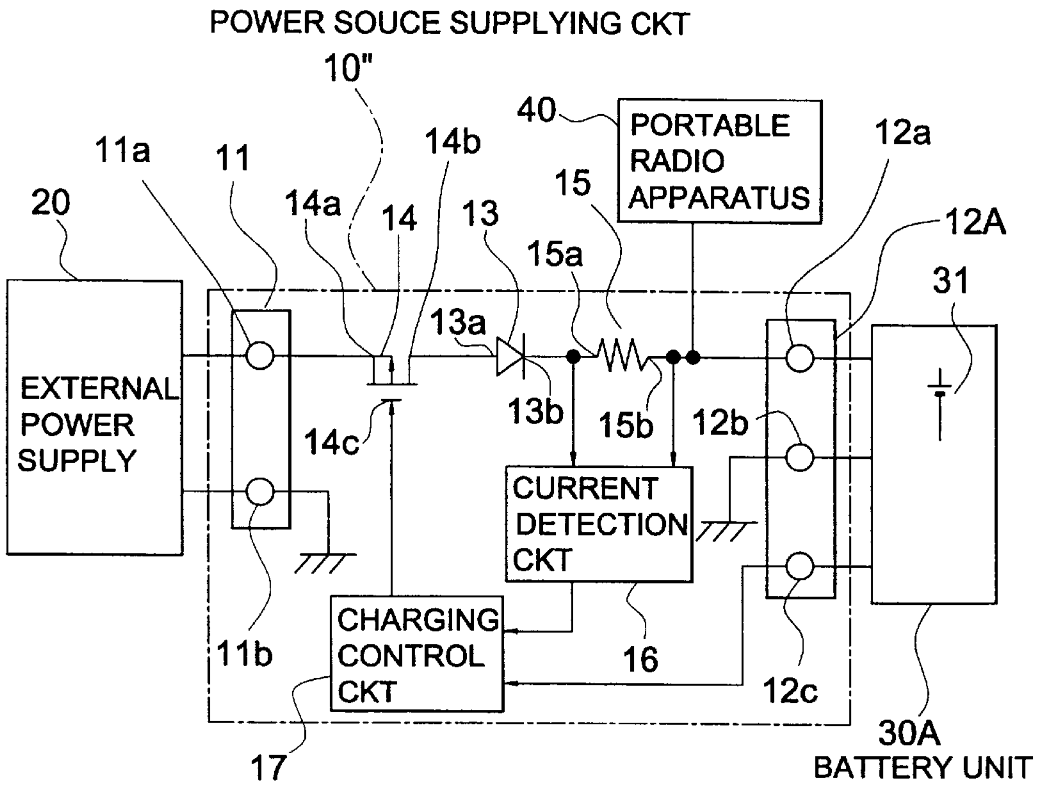
FIG.3 PRIOR ART
FIG. 3 is a block diagram of a conventional power source supplying circuit of a second type.

Referring to FIG. 3, a conventional power source supplying circuit 10" of a second type will be described in order to facilitate an understanding of the present invention. The illustrated power source supplying circuit 10" comprises the external input/output connector 11 and a battery connection terminal 12A. The external input/output connector 11 is connected to the external power supply 20 while the battery connection terminal 12A is connected to a battery unit 30A including a battery 31.

The battery connection terminal 12A has not only the battery connection power source terminal 12*a* and the battery connection ground terminal 12*b* but also a battery connection battery presence or absence detection terminal 12*c*. The battery connection battery presence or absence detection terminal 12*c* is supplied with a battery presence or absence detected signal from the battery unit 30A.

The power source supplying circuit 10" comprises not only the backflow check diode 13 but also a charging control transistor 14 and a current limiting resistor 15. The charging control transistor 14 is disposed between the external input/output connector power source terminal 11*a* and the backflow check diode 13. The current limiting resistor 15 is disposed between the backflow check diode 13 and the battery connection power source terminal 12*a*. Specifically, the charging control transistor 14 consists of a P-channel metal oxide semiconductor field effect transistor (MOSFET). The P-channel MOSFET 14 has a source electrode 14*a* connected to the external input/output connector power source terminal 11*a* and a drain electrode 14*b* connected to the anode electrode 13*a* of the backflow check diode 13. The cathode electrode 13*b* of the backflow check diode 13 is connected to an end 15*a* of the current limiting resistor 15 which has another end 15*b* connected to the battery connection power source terminal 12*a*.

The conventional power source supplying circuit 10" of the second type further comprises a current detection circuit 16 for detecting a current flowing in the current limiting resistor 15 and a charging control circuit 17. The charging control circuit 17 is supplied with a current detected signal and the battery presence and absence detected signal from the current detection circuit 16 and the battery connection battery presence and absence detection terminal 12*c*, respectively. Responsive to the current detected signal and the battery presence and absence detected signal, the charging control circuit 17 controls the charging control transistor 14. The charging control circuit 17 supplies a control signal to a control terminal (gate electrode) 14*c* of the charging control transistor 14.

Figure 4:
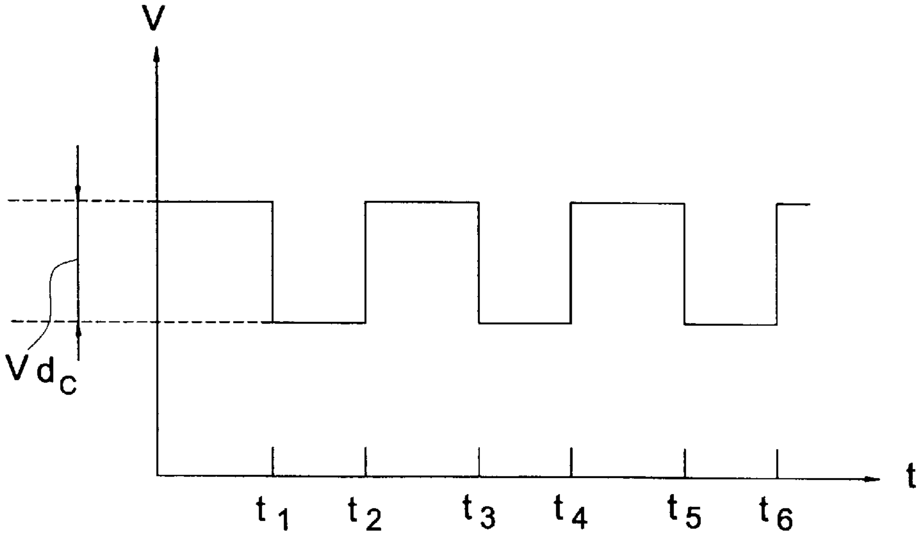
FIG.4 PRIOR ART
FIG. 4 shows a timing chart for use in describing operation of the power source supplying circuit illustrated in FIG. 3.

Referring now to FIG. 4 in addition to FIG. 3, the description will proceed to operation of the conventional power source supplying circuit 10". FIG. 4 illustrates a waveform of a voltage supplied to the portable radio apparatus 40. In FIG. 4, the abscissa represents a time instant t and the ordinate represents the voltage V. In the manner which is described in conjunction with FIG. 2, FIG. 4 illustrates an example where the portable radio apparatus 40 repeats occurrence and release of the load current.

It will be presumed that the external power source voltage is applied to the external input/output connector power source terminal 11*a* in a case where the battery presence and absence detected signal supplied from the battery connection battery presence and absence detection terminal 12*c* indicates an absence of connection of the battery 31. In this event, the charging control transistor 14 is constant-voltage controlled by the charging control circuit 17. That is, the drain electrode 14*b* of the charging control transistor 14 produces a constant-voltage controlled voltage.

Inasmuch as the backflow check diode 13 and the current limiting resistor 15 are disposed between the charging control transistor 14 and the batter connection power source terminal 12*a*, the constant-voltage controlled voltage is supplied to the battery connection power source terminal 12*a* through the backflow check diode 13 and the current limiting resistor 15. Under the circumstances, it will be assumed that portable radio apparatus 40 connected to the battery connection power source terminal 12*a* carries out transmission and reception to flow the load current of several hundreds of milliamperes. In this event, a voltage in the battery connection power source terminal 12*a* drops than the constant-voltage controlled voltage due to a voltage drop caused by the forward voltage $V_f$ of the backflow check diode 13 and the current limiting resistor 15. That is, a combination of the backflow check diode 13 and the current limiting resistor 15 acts as a voltage drop arrangement.

Accordingly, as illustrated in FIG. 4, the load current flows during a time duration from the first time instant $t_1$ of occurrence of the first load current to the second time instant $t_2$ of release of the first load current, during a time duration from the third time instant $t_3$ of occurrence of the second load current to the fourth time instant $t_4$ of release of the second load current, and during a time duration from the fifth time instant $t_5$ of occurrence of the third load current to the sixth time $t_6$ of release of the third load current. As a result, a voltage drop $Vd_C$ caused by the load current increases as compared with the voltage drop $Vd_B$ illustrated in FIG. 2 and it is impossible for the conventional power source supplying circuit 10" of the second type to supply the portable radio apparatus 40 with a stable voltage, as also mentioned in the preamble of the instant specification.

Figure 5:
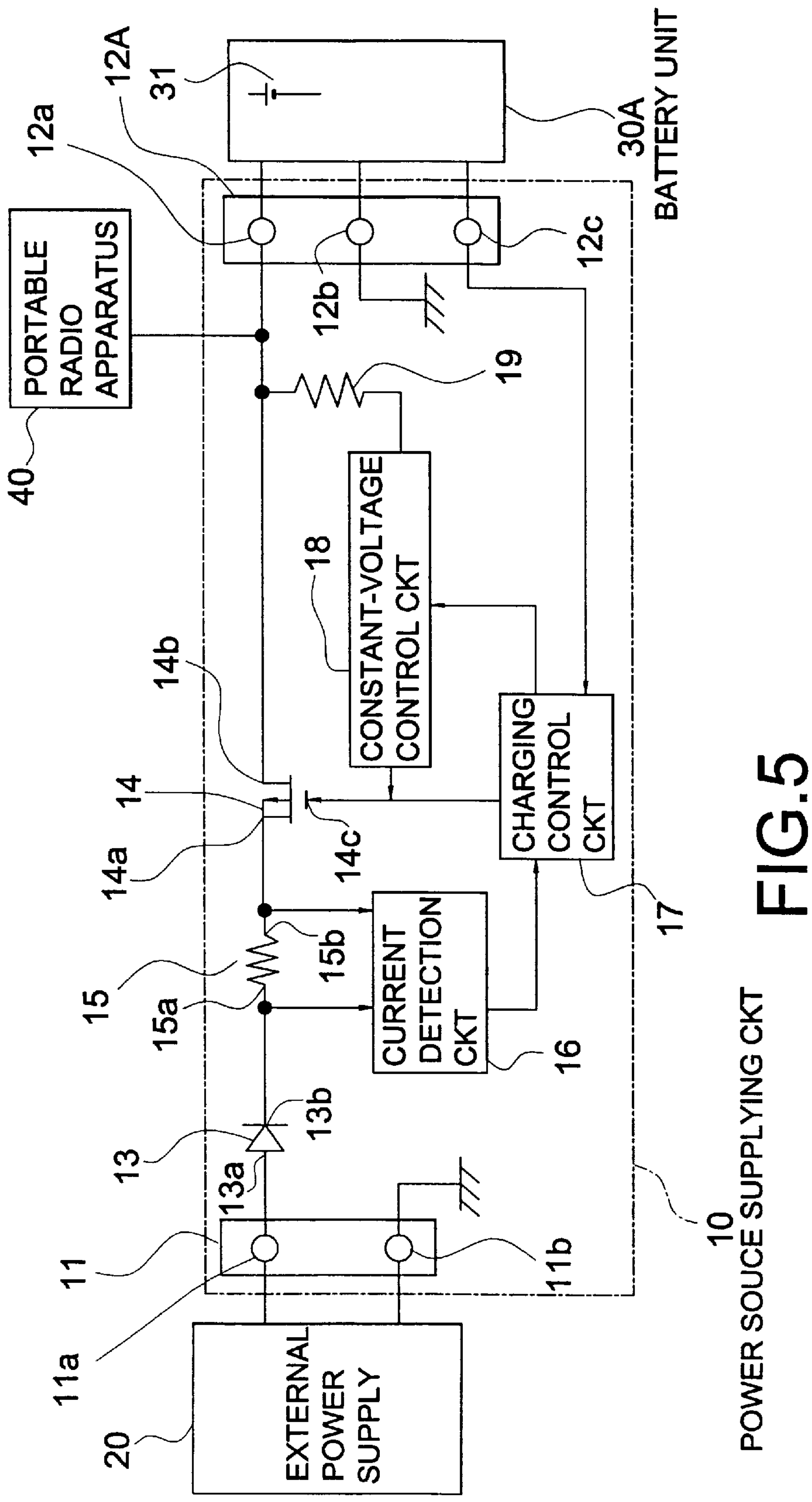
FIG. 5 is a block diagram of a power source supplying circuit according to a first embodiment of this invention.

Referring to FIG. 5, the description will proceed to a power source supplying circuit 10 according to a first embodiment of this invention. The power source supplying circuit 10 is similar in structure and operation to the conventional power source supplying circuit 10" of the second type illustrated in FIG. 3 except that the backflow check diode 13, the charging control transistor 14, and the current limiting resistor 15 are disposed in a state different from those illustrated in FIG. 3 as will later become clear and the power source supplying circuit 10 further comprises a constant-voltage control circuit 18 and a battery voltage monitoring feedback resistor 19. A combination of the charging control transistor 14, the battery voltage monitoring feedback resistor 19, and the constant-voltage control circuit 18 serves as a constant voltage control arrangement for holding the voltage of the battery connection power source terminal 12*a* constant.

More specifically, the backflow check diode 13 and the current limiting resistor 15 are disposed at a side of the external input/output connector power source terminal 11*a* out of the charging control transistor 14 while the backflow diode 13 and the current limiting resistor 15 are disposed to a side of the battery connection power source terminal 12*a* out of the charging control transistor 14 in the conventional power source supplying circuit 10" of the second type illustrated in FIG. 3.

That is, the external input/output connector power source terminal 11*a* is connected to the anode electrode 13*a* of the backflow check diode 13. The cathode electrode 13*b* of the backflow check diode 13 is connected to an end 15*a* of the current limiting resistor 15. The current limiting resistor 15 has another end connected to the source electrode 14*a* of the P-channel MOSFET serving as the charging control transistor 14. The charging control transistor 14 is for control a constant voltage. The both ends 15*a* and 15*b* of the current limiting resistor 15 are connected to the current detection circuit 16. The current detection circuit 16 detects a charging current flowing the current limiting resistor 15 on the basis of a potential difference between the both ends 15*a* and 15*b* of the current limiting resistor 15. The drain electrode of the charging control transistor 14 is connected to the battery connection power source terminal 12*a*, the portable radio apparatus 40, and an end of the battery voltage monitoring feedback resistor 19. The battery voltage monitoring feedback resistor 19 has another end connected to the constant-voltage control circuit 18. The constant-voltage control circuit 18 monitors the voltage of the battery connection power source terminal 12*a* through the battery voltage monitoring feedback resistor 19. The charging control circuit 17 is supplied with the battery presence or absence detected signal and the current detected signal from the battery connection battery presence or absence detection terminal 12*c* and the current detection circuit 16, respectively. The charging control circuit 17 controls not only the constant-voltage control circuit 18 but also the charging control transistor 14. The constant-voltage control circuit 18 controls the charging control transistor 14.

Now, the description will proceed to operation of the power source supplying circuit 10 illustrate in FIG. 5.

It will be assumed that the charging control circuit 17 detects that the battery presence or absence detected signal supplied to the battery connection battery presence or absence detection terminal 12*c* indicates no connection of the battery 31. In this event, the external power source voltage applied to the external input/output connector power source terminal 11*a* passes through the backflow check diode 13 and the current limiting resistor 15, is controlled in the constant voltage by the charging control transistor 14, and then is supplied to the battery connection power source terminal 12*a*. Under the circumstances, the voltage in the battery connection power source terminal 12*a* is monitored in the constant-voltage control circuit 18 through the battery voltage monitoring feedback resistor 19. The constant-voltage control circuit 18 controls the charging control transistor 14 so as to hold or make the battery connection power source terminal 12*a* a constant voltage.

It will presumed that the portable radio apparatus 40 carries out transmission and reception to flow the load current of several hundreds of milliamperes. In this event, the voltage in the battery connection power source terminal 12*a* is about to drop caused by the forward voltage $V_f$ in the backflow check diode 13 and the current limiting resistor 15. However, the constant-voltage control circuit 18 monitors the voltage of the battery connection power source terminal 12*a* through the battery voltage monitoring feedback resistor 19 to control the charging control transistor 14 so as to hold the battery connection power source terminal 12*a* the constant voltage. Accordingly, it is possible to hold the voltage of the battery connection power source terminal 12*a* constant although the load current in the battery connection power source terminal 12*a* drastically changes.

Figure 6:
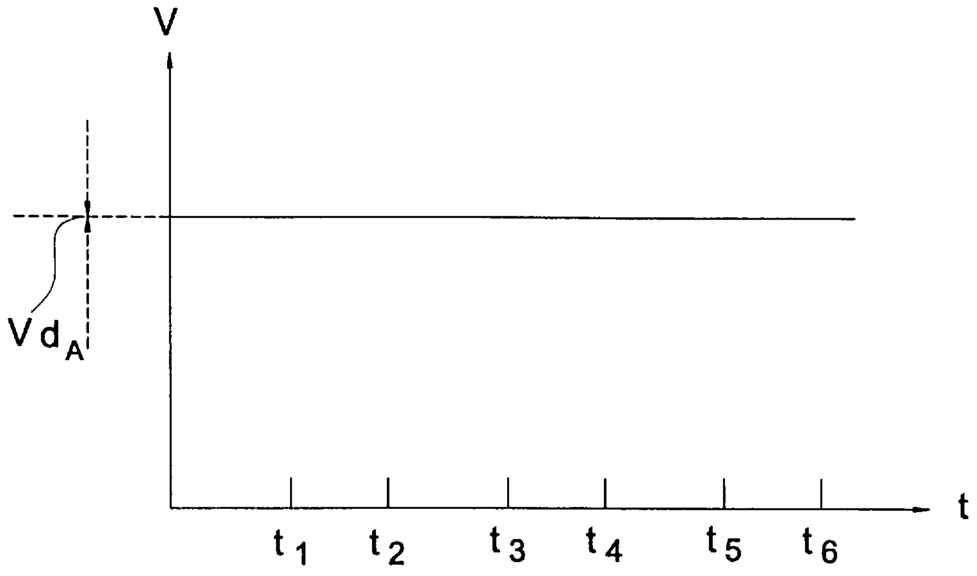
FIG. 6 shows a timing chart for use in describing operation of the power source supplying circuit illustrated in FIG. 5.

FIG. 6 illustrates a transient voltage in the battery connection power source terminal 12*a* in the power source supplying circuit 10 illustrated in FIG. 5. In FIG. 6, the abscissa represents a time instant t and the ordinate represents the voltage V. Transmission and reception of the portable radio apparatus 40 is intermittently carried out by making the portable radio apparatus 40 on-off control to repeat occurrence of a first load current at a first time instant $t_1$, release of the first load current at a second time instant $t_2$, occurrence of a second load current at a third time instant $t_3$, release of the second load current at a fourth time instant $t_4$, occurrence of a third load current at a fifth time instant $t_5$, release of the third load current at a sixth time instant $t_6$, and so on. Although the load current of several hundreds of milliamperes flows in the portable radio apparatus 40 during a time duration from the first time instant $t_1$ of the occurrence of the first load current to the second time instant $t_2$ of the release of the first load current, during a time duration from the third time instant $t_3$ of the occurrence of the second load current to the fourth time instant $t_4$ of the release of the second load current, and during a time duration from the fifth time instant $t_5$ of the occurrence of the third load current to the sixth time instant $t_6$ of the release of the third load current, there is no voltage drop $Vd_A$ caused by the load current in the battery connection power source terminal 12*a*. As a result, it is possible to hold the voltage of the battery connection power source terminal 12*a* constant although the load current in the battery connection power source terminal 12*a* drastically changes.

Figure 7:
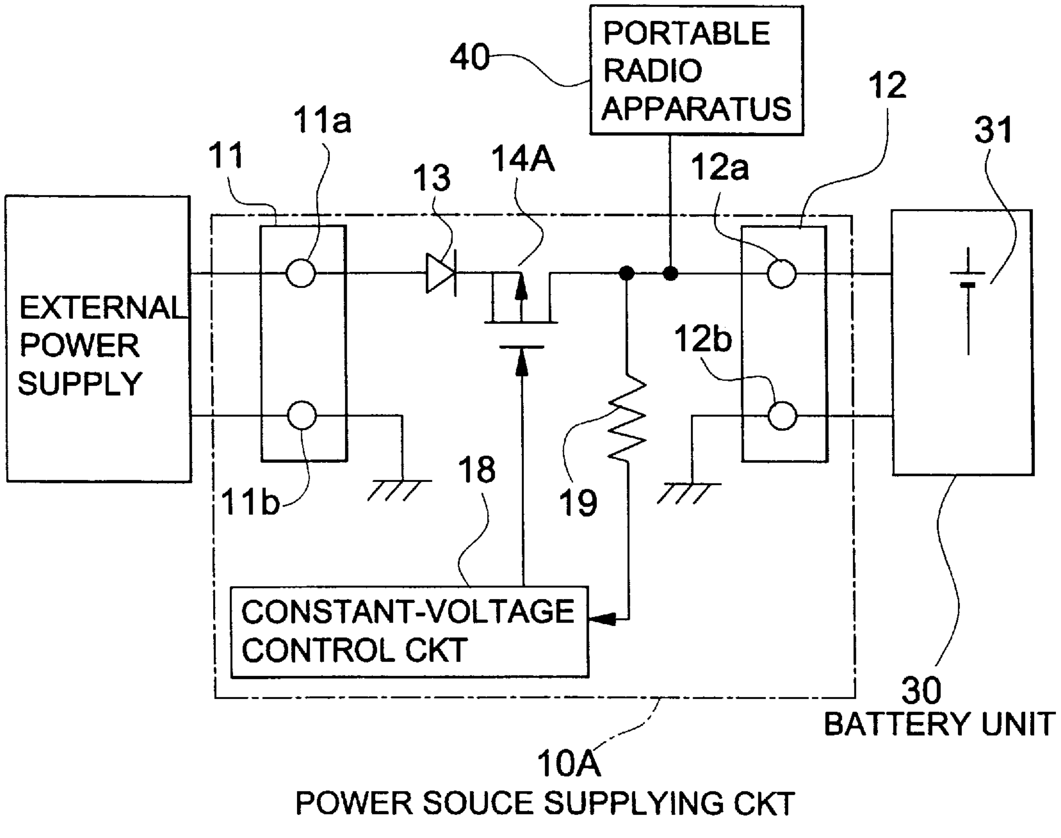
FIG. 7 is a block diagram of a power source supplying circuit according to a second embodiment of this invention.

Referring to FIG. 7, the description will proceed to a power source supplying circuit 10A according to a second embodiment of this invention. The illustrated power source supplying circuit 10A exemplifies a circuit with no charging control. The power source supplying circuit 10A is similar in structure and operation to the conventional power source supplying circuit 10' of the first type illustrated in FIG. 1 except that the power source supplying circuit 10A further comprises the constant-voltage control circuit 18, the battery voltage monitoring feedback resistor 19, and a constant-voltage control transistor 14A.

The constant-voltage control transistor 14A is disposed between the backflow check diode 13 and the battery connection power source terminal 12*a*. The constant-voltage control circuit 18 controls the constant-voltage control transistor 14A. The battery voltage monitoring feedback resistor 19 is for monitoring the voltage in the battery connection power source terminal 12*a*. Accordingly, a constant-voltage control is carries out using a combination of the constant-voltage control transistor 14A, the battery voltage monitoring feedback resistor 19, and the constant-voltage control circuit 18. In the example being illustrated, the constant-voltage control transistor 14A comprises a P-channel MOSFET. That is, the combination of the constant-voltage control transistor 14A, the battery voltage monitoring feedback resistor 19, and the constant-voltage control circuit 18 is operable as a constant-voltage control arrangement for holding the voltage of the battery connection power source terminal 12*a* constant.

With this structure, it is possible to hold the voltage of the battery connection power source terminal 12*a* constant although the load current in the battery connection power source terminal 12*a* drastically changes so that the portable radio apparatus 40 carries out transmission and reception to flow the load current of several hundreds of milliamperes in the battery connection power source terminal 12*a*.

While this invention has thus far been described in conjunction with preferred embodiments thereof, it will now be readily possible for those skilled in the art to put this invention into various other manners. For example, a bipolar transistor may be used as the charging control transistor 14 or the constant-voltage control transistor 14A although the MOSFETs are used as the charging control transistor 14 and the constant-voltage control transistor 14A in the above-mentioned embodiments.

What is claimed is:

1. A power source supplying circuit for supplying a load with an external power source voltage supplied from an external power source terminal thereof, said power source supplying circuit comprising a backflow check diode, a current limiting resistor, and a charging control transistor, wherein said backflow check diode and said current limiting resistor are disposed in a side of said external power source terminal out of said charging control transistor, said power source supplying circuit further comprising:

a current detection circuit, connected between both ends of said current limiting resistor, for detecting a current flowing said current limiting resistor on the basis of a potential difference between the both ends of said current limiting resistor to produce a current detected signal;

a charging control circuit, connected to said current detection circuit and supplied with a battery presence or absence detected signal, for controlling said charging control transistor in response to the current detected signal and the battery presence and absence detected signal;

a feedback resistor having an end connected to said load; and a constant-voltage control circuit, connected to another end of said feedback resistor, for controlling said charging control transistor so as to make a voltage supplied to said load a constant voltage, thereby always supplying a constant stable voltage to said load although a load current of said load varies.

2. A power source supplying circuit as claimed in claim 1, wherein said load comprises a radio apparatus.

3. A power source supplying circuit as claimed in claim 1, wherein said charging control transistor consists of a P-channel metal oxide semiconductor field effect transistor having a source electrode connected to an end of said current limiting resistor, a drain electrode connected to said load, and a gate electrode which is connected to said constant-voltage control circuit and said charging control circuit.

4. A method of supplying a load with an external power source voltage supplied from an external power source terminal, said method comprising the steps of:

applying the external power source voltage through a backflow check diode and a current limiting resistor;

controlling, using constant-voltage control means, a dropped voltage to which the external power source voltage is dropped by said backflow check diode and said current limiting resistor so as to make the dropped voltage a constant voltage; and supplying the constant voltage to said load, thereby always supplying said load with a constant stable voltage although a load current of said load varies.

5. A power source supplying circuit for supplying a load through a backflow check diode with a voltage supplied from an external power source terminal, said power source supplying circuit comprising constant-voltage control means disposed between said backflow check diode and said load, thereby always supplying said load with a constant stable voltage although a load current of said load varies.

6. A power source supplying circuit as claimed in claim 5, wherein said constant-voltage control means comprises:

a constant-voltage control transistor having main electrodes which are connected to said backflow check diode and said load, respectively;

a feedback resistor having an end connected to said load; and a constant-voltage control circuit, connected to another end of said feedback resistor, for controlling said constant-voltage control transistor so that a voltage supplied to said load becomes a constant voltage.

7. A power source supplying circuit as claimed in claim 6, wherein said constant-voltage control transistor consists of a P-channel metal oxide semiconductor field effect transistor having a source electrode connected to a cathode electrode of said backflow check diode, a drain electrode connected to said load, and a gate electrode connected to said constant-voltage control circuit.

8. A method of supplying a load with an external power source voltage supplied from an external power source terminal, said method comprising the steps of:

applying the external power source voltage through a backflow check diode;

controlling, using constant-voltage control means, a dropped voltage to which the external power source voltage is dropped by said backflow check diode so as to make the dropped voltage a constant voltage; and supplying the constant voltage to said load, thereby always supplying said load with a constant stable voltage although a load current of said load varies.

* * * * *